Dec. 23, 1958   H. FORSSELL   2,866,148
CONTROL DEVICE IN A HIGH VOLTAGE D. C. TRANSMISSION PLANT
Filed Sept. 20, 1955
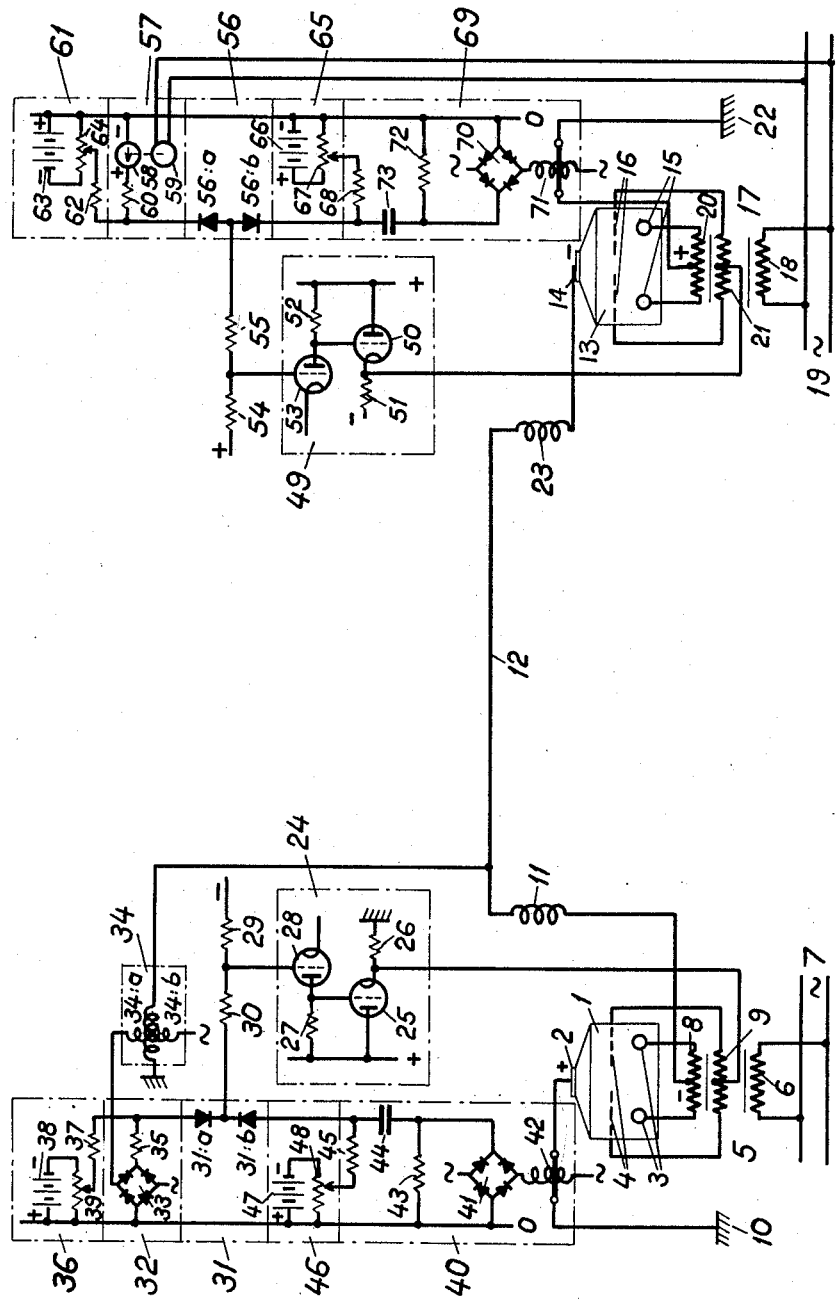
INVENTOR.
Harry Forssell
BY
Attorney.

United States Patent Office 2,866,148
Patented Dec. 23, 1958

2,866,148

CONTROL DEVICE IN A HIGH VOLTAGE D. C. TRANSMISSION PLANT

Harry Forssell, Ludvika, Sweden, assignor to Allmänna Svenska Elektriska Aktiebolaget, Vasteras, Sweden, a corporation of Sweden Application September 20, 1955, Serial No. 535,327

Claims priority, application Sweden September 25, 1954

6 Claims. (Cl. 321—2)

The present invention relates to a high voltage D. C. transmission plant in which electrical energy, supplied by an A. C.-network, is converted to high voltage D. C. in one or several rectifier stations. This D. C.-current is transmitted either on air lines or cables to one or several inverter stations, where the energy is converted again to A. C.-current and supplied to an A. C.-network. Power transmission systems of this type can either be run with constant transmission current and varying D. C.-voltage in the converter stations or with constant D. C.-voltage in at least one of the converter stations, whilst the transmitted D. C.-current varies depending on the energy demand. The last mentioned alternative has the advantage that the converters can work with higher efficiency and greater safety. One of the converter stations, e. g. the rectifier station then determines the transmission voltage in the D. C.-system whilst in at least one of the inverter stations the D. C.-voltage regulated in such a way that a controlled quantity, e. g. the frequency in the receiving A. C.-network assumes predetermined values. In certain cases instead of it the transmission voltage is held constant by at least one of the inverter stations, whilst in at least one of the rectifier stations the rectifiers are controlled in such a way that the transmitted D. C.-current has such a value that the controlled quantity e. g. the above mentioned frequency assumes predetermined values. Whilst such a service condition using constant transmission voltage has many advantages under normal service conditions, it has for instance at commutation failures in an inverter station or on the occasion of other short-circuits in the D. C.-system the disadvantage that the D. C.-current in the rectifier station may increase up to unpermitted high values. At a fault in one of the rectifier stations, causing a voltage decrease in this station, the transmitted D. C.-current, on the other hand, would fall below that value which must be transmitted in respect to the power demand in the receiving A. C.-network. On the occasion of those faults a constant-current system would act more conveniently. In order to eliminate the difficulties appearing in a constant-voltage system at faults control members are provided in at least one of the converter stations, which members at faults make a main signal inactive which under normal service conditions affects the regulator of the station. The control members then replace the main signal by a signal depending on power current alterations (current signal), when this signal exceeds a predetermined value. According to a modification of the invention this value is chosen in such a way that the control members become active when the current signal value exceeds the main signal value by an amount determined by an auxiliary signal. The main signal may be a quantity depending on the controlled quantity, e. g. the frequency, or its deviation from a reference value. It may, however, also be constituted by the transmission voltage or its deviation from a reference value.

The invention will be clear from the accompanying figure. This shows a rectifier station containing a rectifier 1 which via a power line 12 is connected with an inverter 13 in an inverter station. The rectifier 1 is provided with a cathode 2, two anodes 3 and two grids 4. A converter transformer 5 is via one of its windings 6 connected to the feeding A. C.-network 7. One of its secondary windings 8 is via its end terminals connected to the anodes 3 whilst the middle terminal via the damping reactor 11 is connected the power line 12. The rectifier grids 4 receive their control signals from the transformer winding 9, phase shifted in relation to the winding 8, the middle point potential of which is increased or decreased by the D. C.-voltage supplied by the regulator 24. The cathode is at the point 10 connected to ground which functions as current return. In a similar way the inverter 13 contains a cathode 14, two anodes 15 and two grids 16. A transformer 17 is by its winding 18 connected to the receiving A. C.-network 19. The transformer winding 20 is connected to the anodes 15 and via its middle point to ground in point 22. The transformer winding 21 phase-shifted in relation to the winding 20, is used for the grid bias voltage control and receives its middle point potential from the regulator 49. The cathode 14 is connected to damping reactor 23 and to the transmission line 12.

The grid bias potential control of the regulator 1 is as mentioned carried out by the regulator 24. This comprises an output tube 25 with a cathode resistor 26. The grid of this tube is connected to the anode resistor 27, arranged in the anode circuit of the amplifier tube 28. The grid bias potential of the tube 28 is determined by the current which flows from the connection bar, having zero potential, of the transmitters through the transmitters 32, 36, 40 and 46, further through the control members 31, the resistors 30 and 29 to minus. The control members 31 consist of two electric valve 31:$a$, 31:$b$. A current is supplied to the electric valve 31:$a$ which current is determined by the difference between the voltages supplied by a voltage transmitter 32 and a reference value transmitter 36 respectively. The voltage transmitter 32 consists mainly of a rectifier 33 which supplies its voltage to the control member 31:$a$ via a resistor 35. This measuring rectifier is fed from the A. C.-winding 34:$a$ of a measuring magnetic amplifier 34. The control winding 34:$b$ of this magnetic amplifier is connected in between the power line 12 and ground, thus measuring the transmission voltage prevailing on the power line. The reference voltage transmitter 36 consists of a current source 38 and a potentiometer 39. A voltage is derived from the potentiometer by means of a movable contact, which voltage is representative for the value which the transmission voltage normally should assume. This reference voltage is, by means of a resistor 37, subtracted from the D. C.-voltage supplied by the voltage transmitter 32. The transmitter 40, on the other hand, supplies to the regulator 24 a current signal depending on the power current alterations. The transmitter 40 consists of a measuring rectifier 41 connected to the measuring magnetic amplifier 42. This one measures the current transmitted on the power line and its ground connector respectively. The D. C.-current supplied by the measuring rectifier 41 is substantially proportional to the power current. The rectifier is loaded by a resistor 43 and the voltage arising across this resistor causes a current through a capacitor 44, which current depends on the power current alterations (current signal). From this current another current (auxiliary signal), supplied by the auxiliary transmitter 46, is subtracted. The auxiliary transmitter 46 consists of a current source 47 connected to a potentiometer 48. By means of a movable contact an auxiliary signal is derived from this potentiometer. The difference between the current signal and the auxiliary signal is supplied to the control member 31:*b* through the resistor 45. In the inverter station there is a regulator 49, designed in a similar way as the regulator 24 in the rectifier station. This regulator supplies across the cathode resistor 51 an output potential which determines the potential in the middle point of the transformer winding 21. This potential is changed by the output tube 50 the grid of which being controlled by the amplifier tube 53 and its anode resistor 52. The tube 53 has a grid bias potential determined by the current which flows from the plus pole through the resistors 54 and 55, the control members 56, the transmitters 57, 61, 65 and 69 to the transmitter connection bar having zero potential. The control members consist of two electric valves, 56:*a* and 56:*b*. To the control members 56:*a* there is connected on the one hand a transmitter 57, representing the controlled quantity, on the other hand a transmitter 61, representing the reference value of the controlled quantity. The transmitter 57 consists in the shown example of a tachometer generator 58, mechanically coupled with a synchronous motor 59. This one is electrically connected to the receiving A. C.-network 19 and is running with a speed proportional to the frequency of this network. The D. C.-voltage supplied by the generator 58, therefor, is depending on the frequency. By means of the resistors 60 and 62 the difference is built up between this voltage and the D. C.-voltage supplied by the reference transmitter 61. The reference transmitter consists mainly of a current source 63 and a potentiometer 64. From the movable arm on this potentiometer the reference voltage is derived. A transmitter 69 supplying the current signal and the transmitter 65 supplying the auxiliary signal are connected to the electric valve 56:*b*. The current signal transmitter consists of a measuring rectifier 70, rectifying the A. C.-current supplied by the measuring magnetic amplifier 71, thus feeding the resistor 72 by a D. C.-current which is substantially proportional to the power current. The voltage across the resistor 72 makes a current flow through the capacitor 73 at power current alterations, which current produces a voltage drop across the resistors 67, 68. From this voltage an auxiliary signal voltage is subtracted, which is generated by the auxiliary transmitter 65. The auxiliary signal voltage is derived from a potentiometer 67, connected to a current source 66.

The control system shown in the figure works in the following way: It is assumed that the power plant runs under undisturbed conditions. It is further presumed that the plant has to supply such an energy contribution to the receiving A. C.-network 19 that the frequency in this network is kept constant on a predetermined value. The regulator 49 in the inverter station controls the inverter so that this condition is fulfilled. The transmission voltage of the system is determined by the rectifier station, the regulator 24 of which controlling the rectifier 1 in the desired way. For this purpose the transmission voltage is measured by means of the measuring magnetic amplifier 34 and the measuring rectifier 33 and is compared with the reference value supplied by the transmitter 36. The voltage difference between these is zero when the transmission voltage has the correct value. A certain current then flows through the electric valve 31:*a*, the resistor 30 and the resistor 29 to the minus pole, thereby causing a certain bias potential on the grid of the amplifier tube 28. If the transmission voltage would become higher than the reference value, the current flowing through the electric valve 31:*a* would increase and the grid bias potential of the tube 28 would be more positive. The tube current and the voltage drop across the anode resistor 27 would increase with the result that the grid bias potential of the output tube 25 would be more negative. The current in this tube and the voltage drop across the cathode resistor 26 then would decrease. Thus the potential across this resistor connected to the middle point of the transformer winding 9 would be more negative in respect to ground and to the rectifier cathode 2 than before. The result would be that the D. C.-voltage supplied by the rectifier to the transmission line 12 would be lower. The regulating action therefor would have the desired effect. Under these undisturbed service conditions the current signal transmitter 40 and the auxiliary transmitter 46 remain inactive in respect to the regulator. The fact is that no considerable current alteration occurs and that therefore no considerable current flows through the capacitor 44. Besides this a negative voltage is derived from the potentiometer 48 with the result that the potential arising on the electric valve 31:*b* by cooperation between the current signal and the auxiliary signal is more negative than the potential determined by the main signal on the electric valve 31:*a*. Thus the current fed in through the valve 31:*a* dominates the current fed in through the valve 31:*b*. The first mentioned current flowing through the resistors 30 and 29 to minus then produces such a voltage drop across the resistors 29 and 30 that the potential in the connection point between the two valves is more positive than the potential before the valve 31:*b*. No current contribution is therefore given by the current signal and auxiliary transmitters under undisturbed service conditions.

In a similar way the control of the inverter 13 is carried out under normal conditions. When the frequency in the receiving A. C.-network 19 has its correct value the D. C.-voltage supplied by the transmitter 58 is equal to the negative D. C.-voltage supplied by the reference transmitter 61. The main signal value is therefor zero. A certain current then flows from plus through the resistors 54 and 55 and the electric valve 56:*a* to the right hand connection bar of the different transmitters, the bar having zero potential. No current, however, flows from plus through the resistors 54 and 55 through the valve 56:*b* to the current signal transmitter 69 and the auxiliary signal transmitter 65. The fact is that under normal conditions the power current alterations are non-existent or small and the auxiliary signal voltage derived from the potentiometer 67 is positive in relation to zero potential. That means that the current flowing through the valve 56:*a* dominates the current possibly flowing through the valve 56:*b*. Thus a potential being negative in relation to the terminals on the potentiometer 67 occurs in the connection point between the two valves 56. The result is that no current can flow through the valve 56:*b* and that the main signal alone affects the regulator 49.

The conditions become, however, different when the power current due to a power plant fault is heavily changed in relation to the power current prevailing before. If for instance the power current is suddenly increased in the rectifier station due to a short-circuit on the power line or due to a commutation failure in the inverter the measuring rectifier 41 makes a current flow through the capacitor 44 which results in a potential increase before the valve 31:*b*. If the positive voltage thus occurring across the resistor 45 is higher than the negative auxiliary voltage derived from the potentiometer 48, the potential before the valve 31:*b* is higher than zero and thus higher than the main signal potential before the valve 31:*a*. The current flowing through the valve 31:*b* therefor dominates the current flowing through the valve 31:*a*. The first mentioned now produces, by means of the resistors 30 and 29, a potential in the connection point between the valves 31, which potential is higher than the potential before the valve 31:*a*. This one is therefor non-conductive. The result is that the valves 31 make the main signal inactive by their valve function and replace this signal by the current signal which now determines the grid bias potential of the amplifier tube 28. The grid becomes more positive than before with the result that the voltage drop across the anode resistor 27 is increased and the grid bias voltage of the output tube 25 becomes lower. Thus the current through this tube and the voltage drop across the cathode resistor 26 is decreased. As a result the D. C.-voltage of the rectifier 1 is decreased, thus counteracting a power current increase on the transmission line due to the short-circuit. As the power current increase ceases also the current signal ceases to dominate the main signal and the main signal is again capable to influence the voltage control. In a similar way the control members 56 function in respect to the inverter 13. On the occasion of a fault in a rectifier resulting in a transmission voltage decrease, the power current tends to decrease. The measuring magnetic amplifier 71 together with its measuring rectifier 70 therefor supplies a smaller current and the capacitor 73, earlier charged to a certain demand, is partially discharged. A voltage drop then occurs across the loading resistor 68, resulting in a potential decrease before the electric valve 56:b. When this potential decrease caused by the current signal exceeds the amount set on the potentiometer 67, the potential before the valve 56:b will become negative. It will also become more negative than the potential before the valve 56:a, determined by the main signal, i. e. the difference between the voltages of the transmitters 57 and 61. Hereby the current signal begins dominating the main signal. The current then flowing from plus through the resistors 54 and 55 through the valve 56:b causes a potential in the connection point of the valve 56, which potential is more negative than the potential on the other side of the valve 56:a. The last mentioned valve therefor blocks the main signal current. As the current signal by its negative potential can be active the grid of the amplifier tube 53 becomes more negative and the voltage drop across the anode resistor 52 of the tube is decreased. Thus the grid bias potential of the output tube 50 and its current is increased. Across the cathode resistor 51 then a potential occurs becoming more positive in respect to the cathode 14. This potential increase on the middle point of the transformer winding 21 causes a decrease action of the inverter, i. e. a decrease of its voltage. By this action the power current decrease due to the rectifier fault is counteracted and the required energy can be supplied to the A. C.-network 19. As the power current decrease is ended also the blocking function of the electric valve 56:a ceases. The control valves 56 again begin making the main signal active, the current signal becoming inactive.

In the shown example it is presumed that the rectifier station determines the transmission voltage whilst the inverter station is regulated in such a way that the frequency assumes a predeermined value. Instead of the frequency the power current itself or the transmitted power may be used for building-up the main signal. This alternative is actual when the converter plant has to supply a constant power amount to the receiving A. C.-network 19. It is previously mentioned the two converter stations may also co-operate in such a way that the transmission voltage is kept constant by the inverter whilst the rectifier is regulated in such a way that the frequency in the receiving A. C. network 19 is kept constant or that a constant power amount is supplied to this network. The devices 32, 34 in the rectifier station are then replaced by a device corresponding to the transmitter 57 in the figure. The controlled quantity, i. e. the frequency or its deviations from a reference value are then transmitted from the receiving A. C.-network to the rectifier station for instance by means of a telemetering equipment and are there inserted as a D. C.-voltage before the controlling valve 31:a.

According to the invention the main signal becomes inactive and the current signal becomes active when the last mentioned signal exceeds the main signal value by a certain amount determined by the auxiliary signal. In the shown example the auxiliary signal voltage produced by the auxiliary transmitters 46 and 65 respectively have been inserted on the same side of the control valves 31 and 56 respectively as the current signal voltage. The same result, of course, is obtained by inserting the auxiliary voltage together with the main signal, i. e. through the control valves 31:a and 56:a respectively. In this case, of course, the auxiliary voltage must have the opposite direction compared with the shown connection scheme.

In the shown example the main signal has been built-up as a difference between the transmission voltage and the controlled quantity respectively at one hand and their reference values on the other hand. The difference has been inserted in both cases on that side of the valves 31:a and 56:a respectively which are not connected together with the valves 31:b and 56:b respectively. The desired action is, according to the invention, obtained also in that case that these differences are built-up on different sides of the valves 31:a and 56:a respectively. The transmission voltage and the controlled quantity respectively are then inserted as shown in the figure. The reference voltage which must have the opposite direction is inserted in the connection point between the resistors 30, 29 and 54, 55 respectively. The reference signals may also be inserted by connecting the resistors 29 and 54 respectively to potentials which are more negative and more positive respectively than those according to the device shown in the figure.

The control members have been shown in the example as two electric valves directed against each other. Instead of these the selection of the dominating signal may be carried out by means of other control members, e. g. by relays. Such a relay may for instance be designed as a balance relay, the one measuring system of which being transferred by a current which is determined by the current signal and the auxiliary signal, the other system by a current, which is determined by the main signal or its deviation from the reference value. A change-over contact on the relay can then connect the regulator input to one or the other of the mentioned circuits depending on in which of them the current dominates.

The power plant shown in the figure contains only one rectifier station and one inverter station. The invention may however, be used in high voltage D. C.-transmission plant containing more than one rectifier station and/or one inverter station. At least one of these then determines the transmission voltage and at least one other regulates the D. C.-voltage in such a way that a controlled quantity assumes predetermined values. In at least one of the converter stations the main signal is then constituted by an electric quantity which represents the transmission voltage or its deviation from a reference value. In at least one other station the control action, under undisturbed service conditions, is carried out by means of a main signal which is equal to the controlled quantity, i. e. the frequency, or its deviation from a reference value.

I claim as my invention:

1. In an electrical power system, which includes means for high voltage D. C. transmission of power current between static converter stations each including at least one converter, an electrical regulating device in at least one of said stations, said regulating device having its output operatively connected to the grid of at least one of said converters for controlling its grid bias potential, and control means having its output operatively connected to the input of said regulating device, first means responsive to the variations in one of the electrical quantities of the system for supplying a first signal to the input of said control means, and a second means responsive to the rate of change in said power current for supplying a second signal to the input of said control means, said control means including means responsive at least in part to said second signal for transmitting selectively one of said first and second signals only to the input of said regulating device.

2. In a regulating device according to claim 1, said first means comprising a third means quantitatively responsive to said electrical quantity for supplying a third signal, a fourth means responsive to a predetermined standard quantity for supplying a fourth signal and means for combining subtractively said third and fourth signals to form said first signal as the difference therebetween.

3. In a regulating device according to claim 1, said second means comprising a fifth means quantitatively responsive to the rate of change in said power current for supplying a fifth signal, a sixth means responsive to a predetermined standard quantity for supplying a sixth signal and means for combining subtractively said fifth and sixth signals to form said second signal as the difference therebetween.

4. In a regulating device according to claim 1, said last means being responsive to the difference between the values of the first and second signals to transmit the signal of greater value only.

5. In a regulating device according to claim 4, said last means comprising two electrical valves connected in opposed relation to each other and a connection from a point between said valves to the input of said regulating device and connections from the opposite sides of said valves to said first and said second means respectively.

6. In a regulating device according to claim 1, said first means being responsive to variations in the D. C. transmission voltage of said high voltage D. C. transmission means.

References Cited in the file of this patent

UNITED STATES PATENTS

| | | |
|---|---|---|
| 1,364,129 | Meyer | Jan. 4, 1921 |
| 2,013,454 | Willis | Sept. 3, 1935 |
| 2,208,182 | Elder | July 16, 1940 |